United States Patent
Lacey (10) Patent No.: US 12,447,886 B2
(45) Date of Patent: Oct. 21, 2025

(54) LAUNDRY TRANSPORT AND PATHOGEN CONTAINMENT APPARATUS AND METHOD

(71) Applicant: Bertram E. Lacey, Frederick, MD (US)

(72) Inventor: Bertram E. Lacey, Frederick, MD (US)

( * ) Notice: Subject to any disclaimer, the term of this patent is extended or adjusted under 35 U.S.C. 154(b) by 860 days.

(21) Appl. No.: 17/721,570

(22) Filed: Apr. 15, 2022

(65) Prior Publication Data

US 2023/0331133 A1   Oct. 19, 2023

(51) Int. Cl.
| | |
|---|---|
| *D06F 95/00* | (2006.01) |
| *B60H 1/00* | (2006.01) |
| *B60P 1/36* | (2006.01) |
| *B60S 1/64* | (2006.01) |
| *D06F 58/12* | (2006.01) |

(52) U.S. Cl.
CPC ............ *B60P 1/36* (2013.01); *B60H 1/00014* (2013.01); *B60H 1/00364* (2013.01); *B60H 1/00785* (2013.01); *B60S 1/64* (2013.01); *D06F 58/12* (2013.01); *D06F 95/00* (2013.01)

(58) Field of Classification Search
CPC ... B60P 1/36; B60H 1/00014; B60H 1/00364; B60H 1/00785; B60H 3/0085; B60H 3/0007; B60S 1/64; D06F 58/12; D06F 95/00; B08B 3/02; B08B 9/0861
See application file for complete search history.

(56) References Cited

U.S. PATENT DOCUMENTS

| | | | |
|---|---|---|---|
| 3,698,029 A * | 10/1972 | Pulliam | B08B 1/20 134/123 |
| 5,944,472 A | 8/1999 | Scofield | |
| 6,483,434 B1 | 11/2002 | UmiKer | |
| 7,649,462 B2 | 1/2010 | Ellis et al. | |
| 7,876,220 B2 | 1/2011 | Aldridge | |
| 9,090,253 B2 | 7/2015 | Flath et al. | |
| 2005/0217701 A1* | 10/2005 | Holbrook | B60S 3/004 134/131 |
| 2013/0055587 A1* | 3/2013 | Lacey | F26B 23/00 34/79 |
| 2013/0231808 A1* | 9/2013 | Flath | B60W 20/10 903/903 |
| 2020/0125905 A1 | 4/2020 | Bing et al. | |

* cited by examiner

*Primary Examiner* — Erin F Bergner
(74) *Attorney, Agent, or Firm* — Dale J. Ream

(57) ABSTRACT

A laundry transport apparatus and method includes a container defining an interior area configured to accommodate a plurality of laundry carts, the container having a door movable between closed and open configurations to selectively allow access to said interior area. The apparatus includes a ventilation network to pass air to and from the interior area, the ventilation network including a pathogen identification and containment apparatus to detect, isolate and treat potentially harmful material within the soiled laundry. The laundry transport apparatus includes a self-cleaning assembly operable to spray cleaning solution upon the laundry carts if a pathogen detected. The laundry transport apparatus includes a solar module to power electrical systems and a conveyor assembly for convenient movement of a plurality of laundry carts. The laundry transport apparatus includes personal protective equipment that has been decontaminated using dry heat.

18 Claims, 10 Drawing Sheets

LAUNDRY TRANSPORT AND PATHOGEN CONTAINMENT APPARATUS AND METHOD

CROSS-REFERENCE TO RELATED APPLICATIONS

This is related to non-provisional patent application Ser. No. 14/664,776 filed Mar. 20, 2015 and issued as U.S. Pat. No. 10,393,434, which claims the benefit of non-provisional patent application Ser. No. 13/406,526 filed Feb. 27, 2012 and issued as U.S. Pat. No. 8,985,475 on Mar. 26, 2015 which claims the benefit of non-provisional patent application Ser. No. 12/357,459 filed Jan. 22, 2009 and issued as U.S. Pat. No. 8,123,141 on Feb. 28, 2012, all of which are incorporated in their entirety and all of which were filed by the present inventor.

BACKGROUND OF THE INVENTION

This invention relates generally to laundry systems and, more particularly, to a method and apparatus for transporting linens that increases the efficiency and lowers the cost of laundering textiles, as well as provides identification, tracking, containment, and treatment of potentially harmful pathogens within a mobile clean room.

Linens are typically collected from commercial users during normal working hours from multiple workstations, such as from hospitals, nursing facilities, or industrial facilities. The soiled linens are usually placed into linen carts that remain in predetermined locations throughout the facility. The linen carts are retrieved upon arrival of the laundry truck from a laundry processing facility and weighted prior to loading onto the truck. This process is very inefficient and may lead to delays for both the cleaning staff and the launderers. Another problem frequently experienced in laundry processing is that linens may not be properly stored and thus may become degraded by environmental factors such as ultraviolet light, moisture, temperature, insects, and textile mold and mildew.

Various devices have been proposed in the art for transporting and laundering textiles. Although assumedly effective for their intended purposes, the existing devices and methods are either inefficient, not cost effective, or fail to optimize the sanitation and freshness characteristics of the textiles being transported and laundered. For example, U.S. Pat. No. 7,310,969, titled "Controlled-Environment Cargo Container," issued to Robert Dale on Dec. 17, 2007, teaches an apparatus for controlling the environment of cargo through lateral ventilation. However, the prior art does not address, among other things, running inlet and outlet ducts adjacently in a thermal transfer configuration, which tends to reduce or eliminate condensation of moisture from the warmer air volume. Nor does the prior art teach the use and integration of a pathogen control system. Still further, the prior art does not teach a self-cleaning pathogen-eliminating assembly, a pathogen system having personal protective equipment (PPE) equipment, an associated conveyor belt assembly for loading and unloading laundering textiles, and an associated solar power assembly to ensure a power source when traditional electric power is unavailable.

Therefore, it would be desirable to have an apparatus and method for transporting and laundering textiles that is efficient and cost-effective. Further, it would be desirable to have an apparatus and method for transporting and laundering textiles that provides a transportation apparatus that avoids degradation of stored linens from environmental factors. Further, it would be a desirable addition to the art to provide a thermal transfer configuration. Further still, it would be desirable to provide an effective pathogen control system to the laundry transportation system. In addition, it would be desirable to have an apparatus and method for transporting and laundering textiles that is self-cleaning upon detection of a pathogen and that includes a conveyor assembly for loading or unloading the plurality of laundry carts. In addition, it would be desirable to provide an effective pathogen control system having reusable PPE that can be decontaminated and stored until used by a person entering or proximate the pathogen control system.

SUMMARY OF THE INVENTION

Therefore, a laundry transport apparatus and method according to the present invention includes a mobile container defining an interior area configured to accommodate a plurality of laundry carts, the container having a door movable between closed and open configurations to selectively allow access to said interior area. In an embodiment, the container is a trailer configured to be moved by a vehicle. The apparatus includes a ventilation network to pass air to and from the interior area, the ventilation network including an intake duct for channeling air to the interior area and an outlet duct for channeling air from the interior area. At least a portion of the intake and outlet ducts are immediately adjacent one another to influence temperature of air passing through each duct, warmer air passing through one of the intake ducts or the outlet duct becoming cooler and cooler air passing through another of the intake duct or the outlet duct becoming warmer. The apparatus ventilation network may be coupled to a pathogen system for detecting, containing, and treating potentially harmful pathogens, for example *Mycobacterium tuberculosis* (TB) and *Bacillus antracis* (anthrax). In a related aspect, the laundry transport apparatus may include reusable Personal Protective Equipment (PPE) associated with the pathogen system that may be decontaminated using dry heat according to Food and Drug (FDA) guidelines.

Further, the laundry transport apparatus may include a self-cleaning assembly having a reservoir of cleaning fluid in communication with a conduit and a plurality of nozzles positioned upwardly adjacent a plurality of carts for selectively dispensing the cleaning fluid thereon. This may occur if the pathogen system detects a predetermined pathogen or at predetermined intervals of time. In addition, the laundry transport apparatus may include a conveyor assembly configured for automating movement of laundry containers into or out of a transport container. In another aspect, electrical power for all of the electrical components of the present invention may be provided by respective solar cells.

Therefore, a general object of this invention is to provide an apparatus and method for transporting and storing linens that avoids degradation of linens which may be caused by environmental conditions.

Another object of this invention is to provide an apparatus and method, as aforesaid, having a container that is climate controlled.

Still another object of this invention is to provide an apparatus and method, as aforesaid, that increases the efficiency and cost-effectiveness of laundry transportation and storage services.

Yet another object of this invention is to provide an apparatus and method, as aforesaid, in which the laundry transport container is a truck trailer that is movable between pickup, processing, and receiving facilities.

A further object of this invention is to provide an apparatus and method, as aforesaid, in which the transport trailer maintains an internal air environment that is controlled by a processor and may be remotely monitored.

A further objective of this invention is to provide an apparatus and method, as aforesaid, in which the internal air environment may be monitored, isolated, and treated to isolate infectious diseases or pathogens.

Yet another of this invention is to provide an apparatus and method, as aforesaid, which includes Personal Protective Equipment (PPE) that may be decontaminated using dry heat for use by entrants to the apparatus.

A particular object of this invention is to provide an apparatus and method, as aforesaid, that includes a self-cleaning assembly that is configured to dispense a cleaning fluid (liquid or gas) onto the plurality of laundry carts when one of a predetermined pathogens is detected inside the trailer.

Another particular object of this invention is to provide an apparatus and method, as aforesaid, which includes a conveyor assembly positioned within the trailer and configured for moving the plurality of laundry carts into or out of the interior area of the trailer.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1a is a perspective view of a laundry transport container according to a preferred embodiment of the present invention;

FIG. 1b is a perspective view from a reverse angle of the laundry transport container as in FIG. 1a;

FIG. 2b is an isolated view on an enlarged scale taken from FIG. 2a;

FIG. 3b is an isolated view on an enlarged basis taken from FIG. 3a;

FIG. 6b is an isolated view on an enlarged basis taken from FIG. 6a;

DESCRIPTION OF THE PREFERRED EMBODIMENT

A laundry transport apparatus and a method of transporting laundry will now be described in detail with reference to FIGS. 1a through 8 of the accompanying drawings. More particularly, an exemplary laundry transport apparatus 100 includes a container 110.

Figures 1A, 1B:
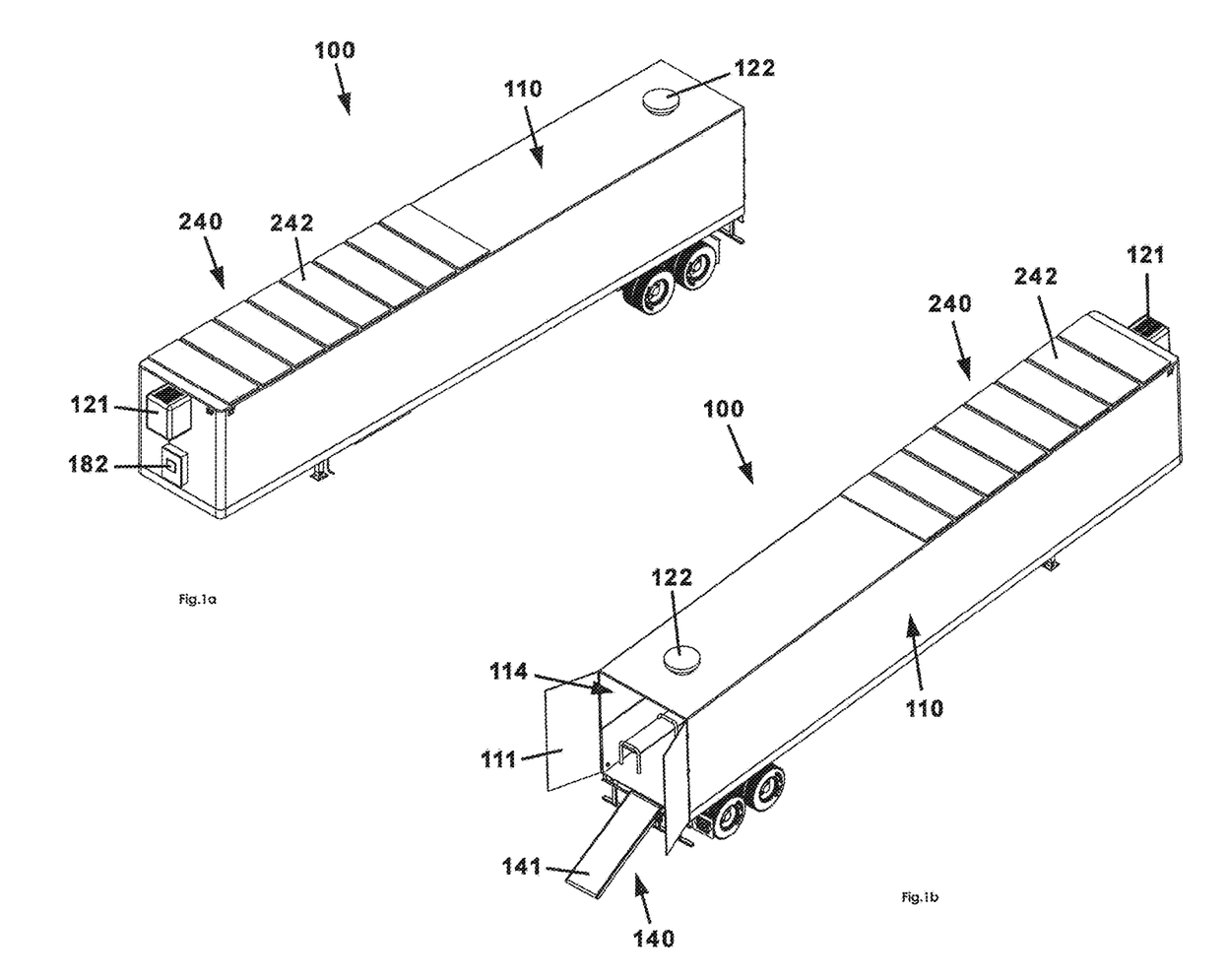
Figure 2A:
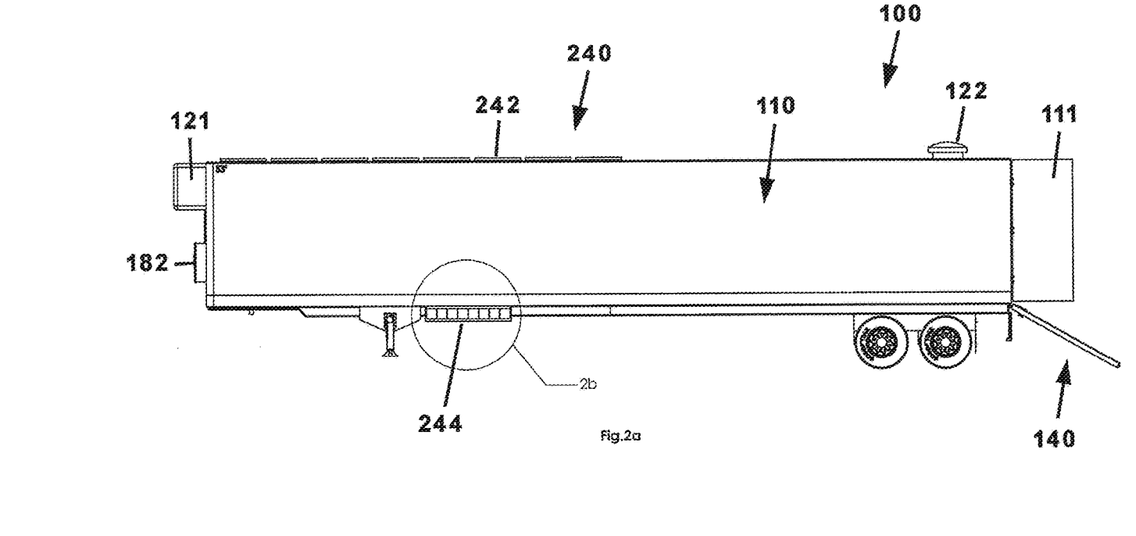
FIG. 2a is a side view of the laundry transport container as in FIG. 1b.
Figure 2B:
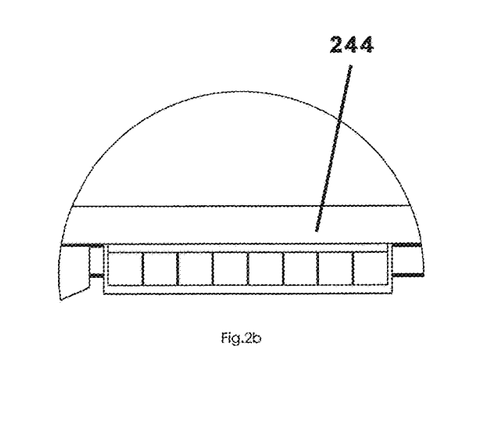
Figure 2C:
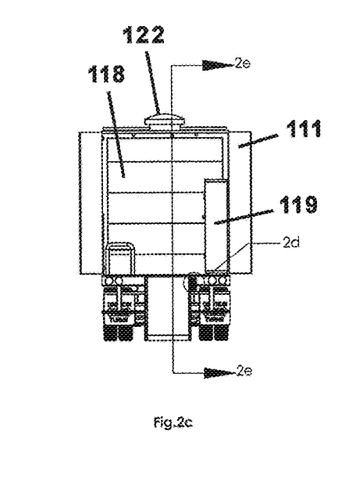
FIG. 2c is a rear view of the laundry transport container as in FIG. 1b.
Figure 2D:
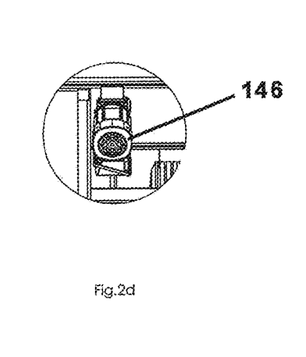
FIG. 2d is an isolated view on an enlarged scale taken from FIG. 2c.
Figure 2E:
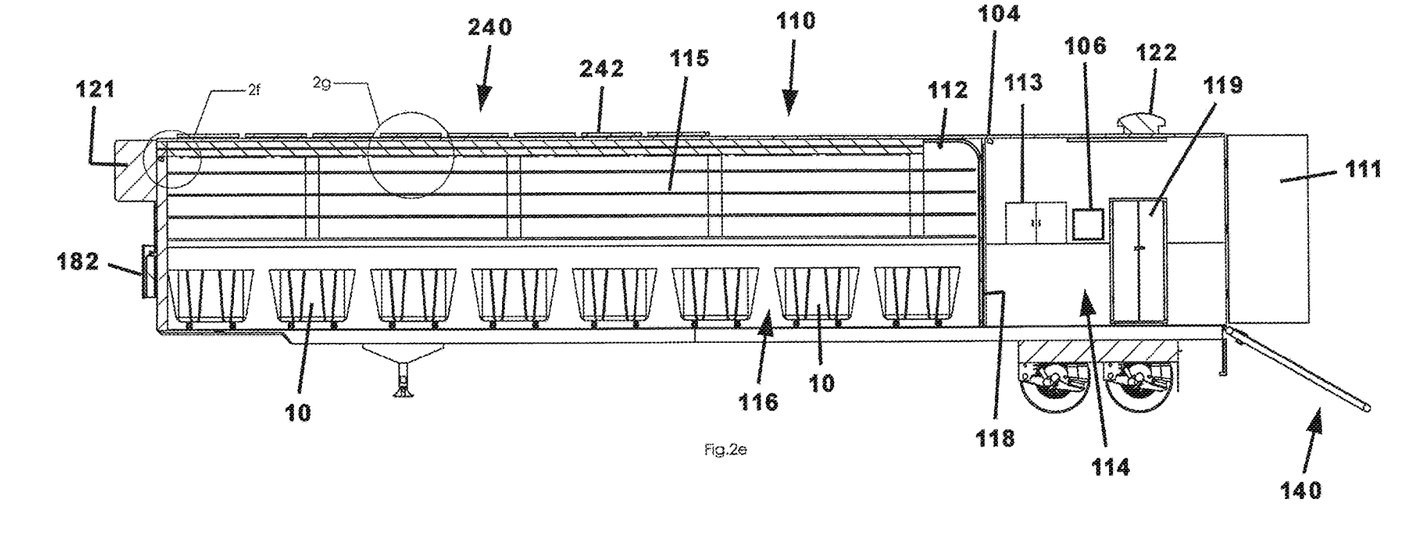
FIG. 2e is a sectional view taken along line 2e-2e of FIG. 2d, illustrated in an unloaded configuration.
Figure 2F:
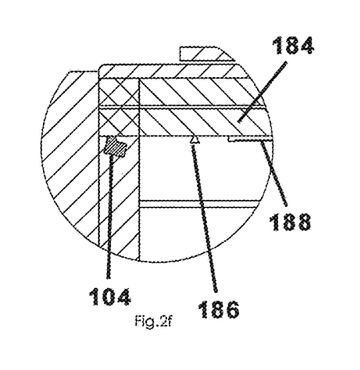
FIG. 2f is an isolated view on an enlarged scale taken from FIG. 2e.
Figure 2G:
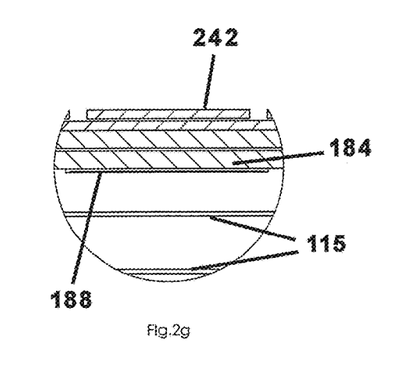
FIG. 2g is an isolated view on an enlarged scale taken from FIG. 2e.
Figure 3A:
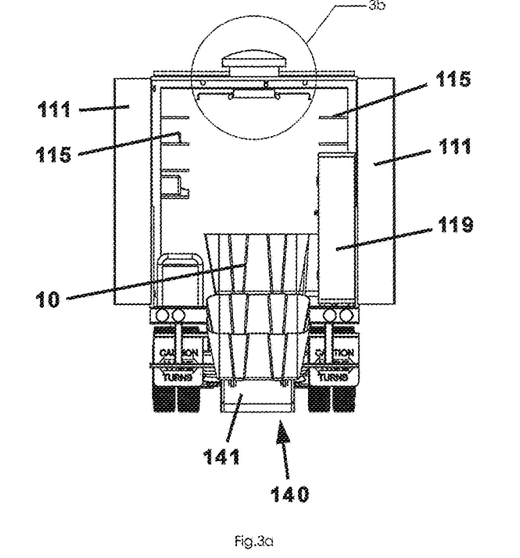
FIG. 3a is a rearview of the laundry transport container as in FIG. 1b, illustrated with an interior door illustrated in a raised configuration.
Figure 3B:
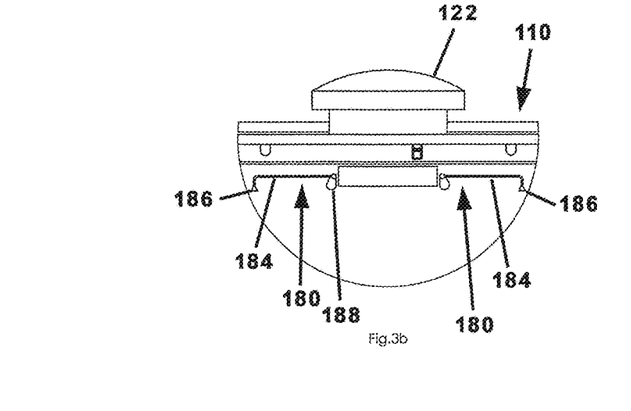
Figure 3C:
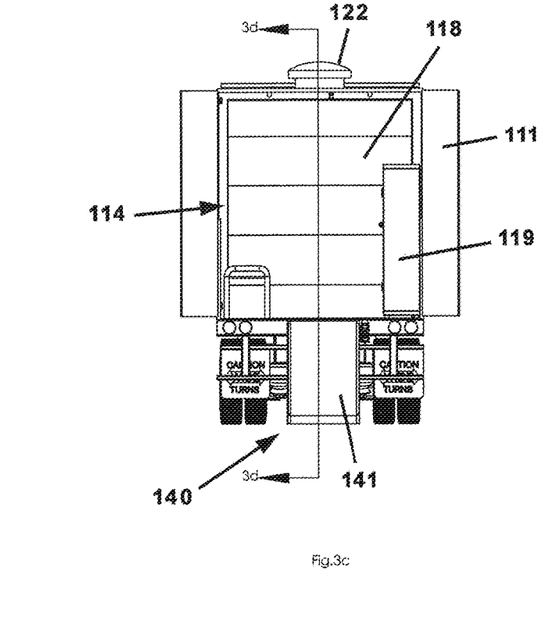
FIG. 3c is a rearview of the laundry transport container as in FIG. 3a, illustrated with the interior door in a closed configuration.
Figure 3D:
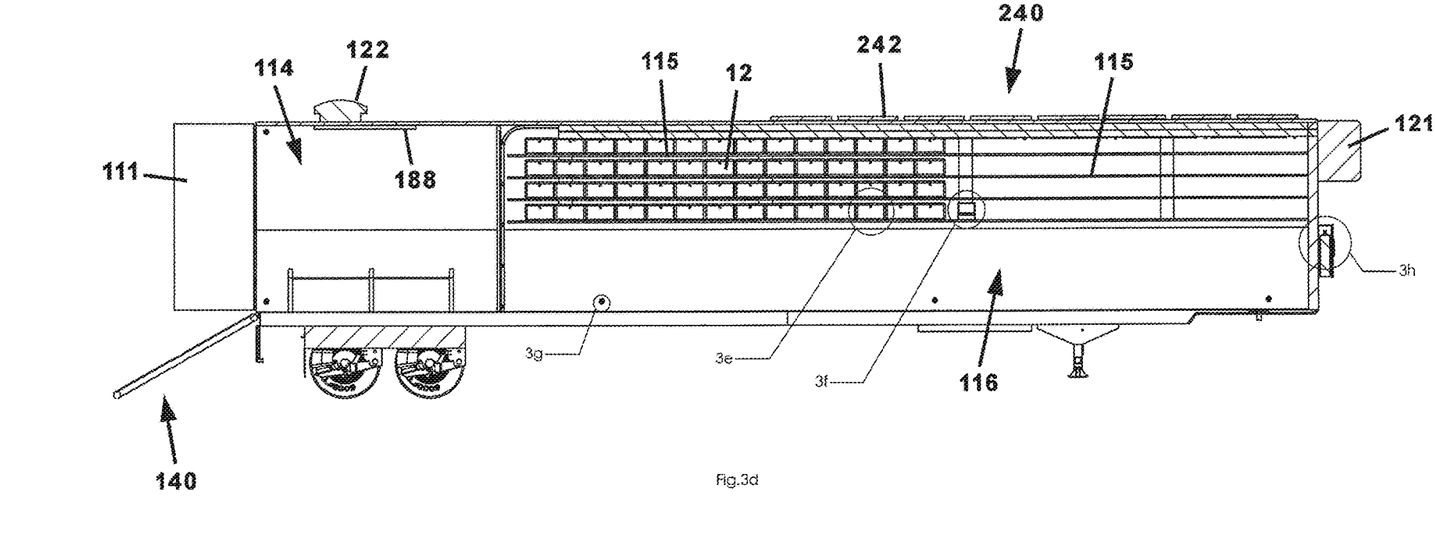
FIG. 3d is a sectional view as in FIG. 2e, illustrated in a loaded configuration.
Figure 3E:
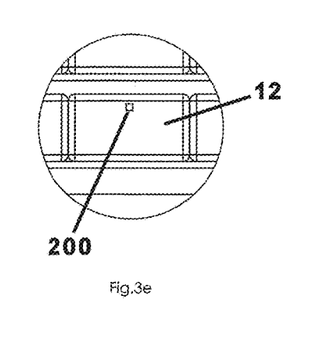
FIG. 3e is an isolated view on an enlarged basis taken from FIG. 3d.
Figure 3F:
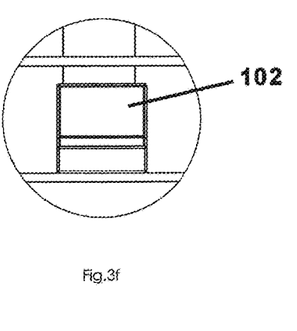
FIG. 3f is an isolated view on an enlarged basis taken from FIG. 3d.
Figure 3G:
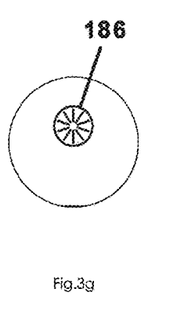
FIG. 3g is an isolated view on an enlarged basis taken from FIG. 3d.
Figure 3H:
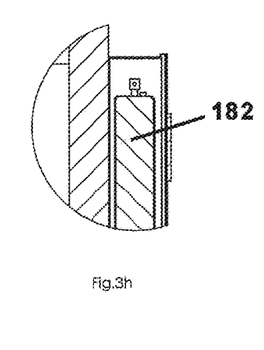
FIG. 3h is an isolated view on an enlarged basis taken from FIG. 3d.

As shown in FIG. 1a, the container 110 defines an interior area 112 and has an outer door 111 for accessing the interior area 112. The door is movable between a closed configuration (FIG. 1a) and an open configuration (FIG. 1b) to selectively allow access to the interior area 112. The container 110 is configured to accommodate a plurality of laundry carts 10 in the interior area 112 (FIG. 2e). The container 110 may be a trailer (also referred to as 110) configured to be moved by a vehicle (not shown), may have wheels, or may be otherwise mobile.

In an embodiment, the interior area 112 may be segregated into a front compartment 114 and rear compartment 116 and may include an interior door 118 intermediate the front and rear compartments 114, 116. The interior door 118 is slidably movable between a closed configuration preventing access to the rear compartment 116 and an open configuration allowing access to the rear compartment 116. In this embodiment, the interior door 118 may be slidable between open and closed configurations, such as a tall semi-truck garage door. In addition, the front compartment 114 may be routinely sanitized, such as by the self-cleaning assembly 180 in cooperation with the pathogen system as will be described in further detail later.

Figure 4A:
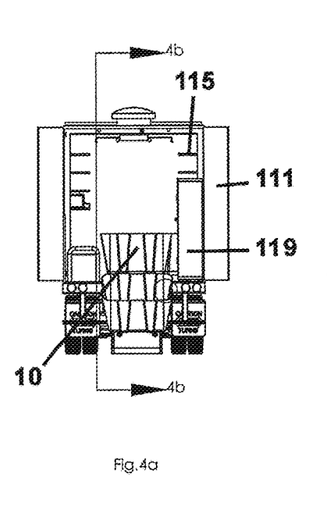
FIG. 4a is a rearview of the laundry transport container as in FIG. 3a, illustrated showing multiple container carts being removed and conveyed.
Figure 4B:
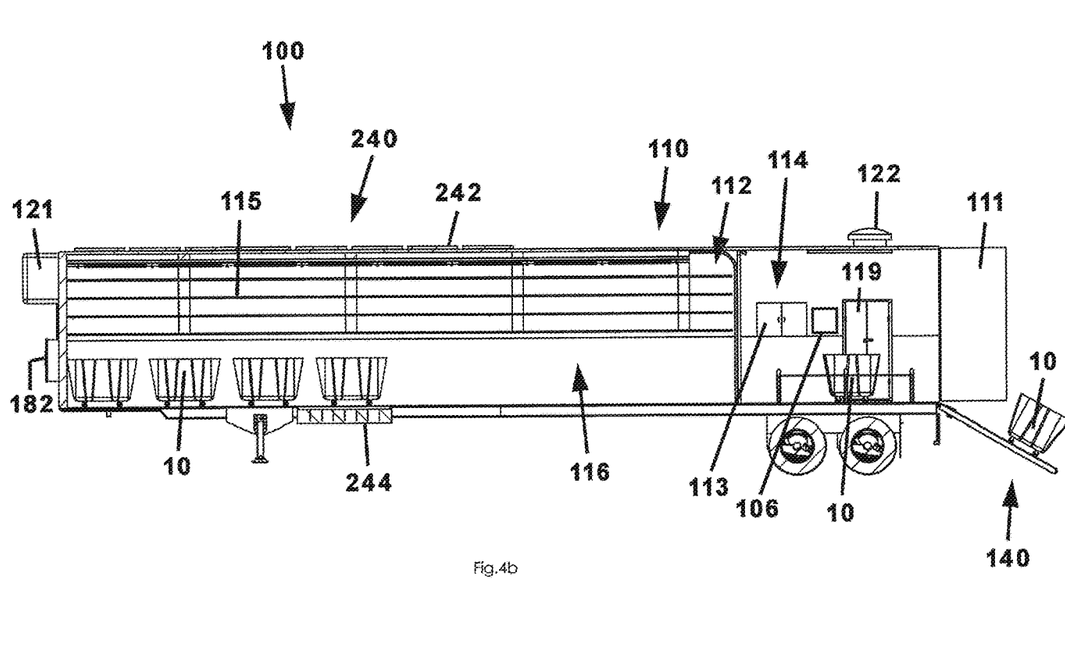
FIG. 4b is a sectional view taken along line 4b-4b of FIG. 4a, illustrated with linens being distributed according to the present invention.
Figure 5:
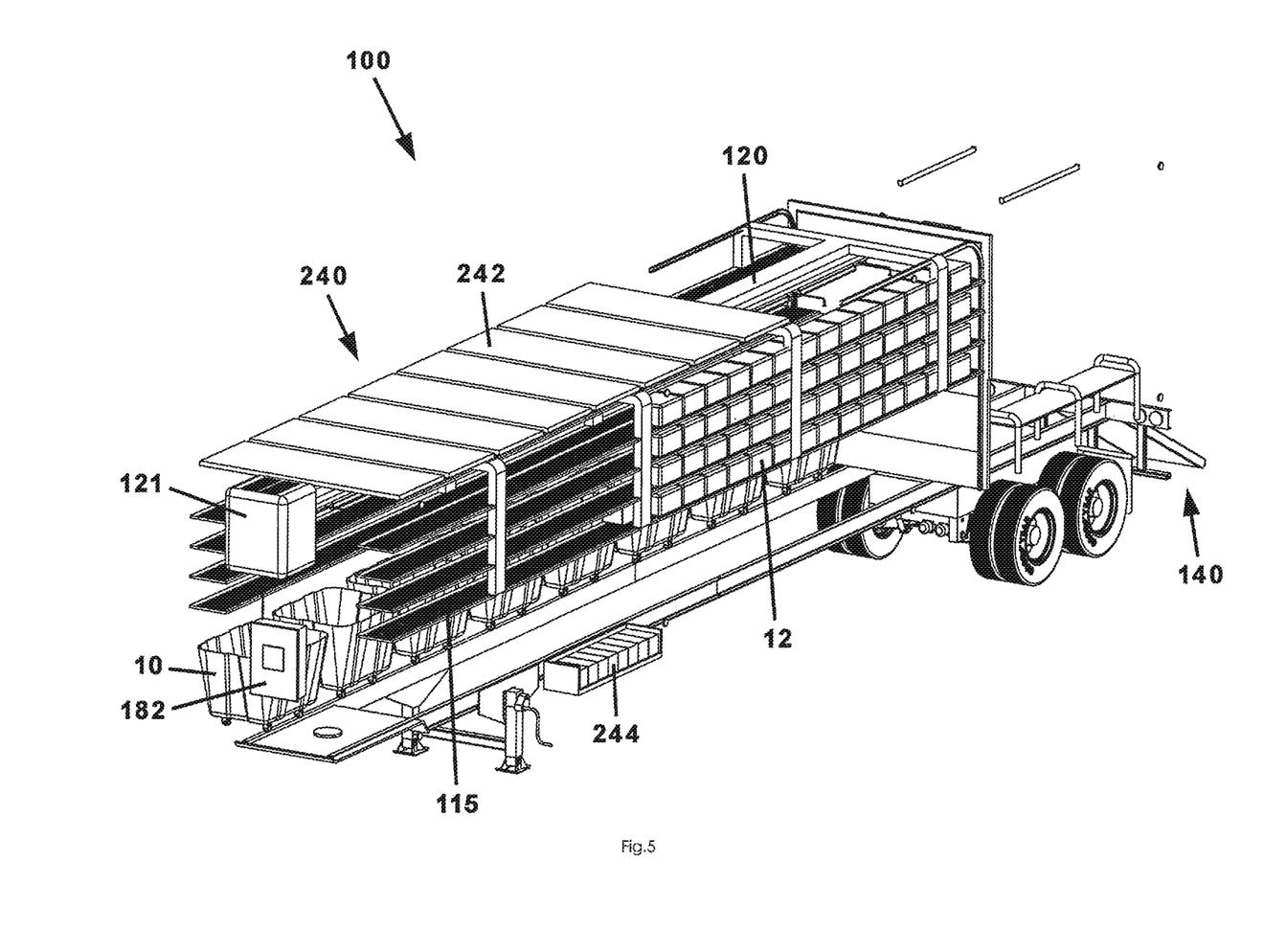
FIG. 5 is a perspective view of the laundry transport container as in FIG. 1a, illustrated with exterior walls of the mobile container removed and shown partially loaded for clarity.
Figure 6A:
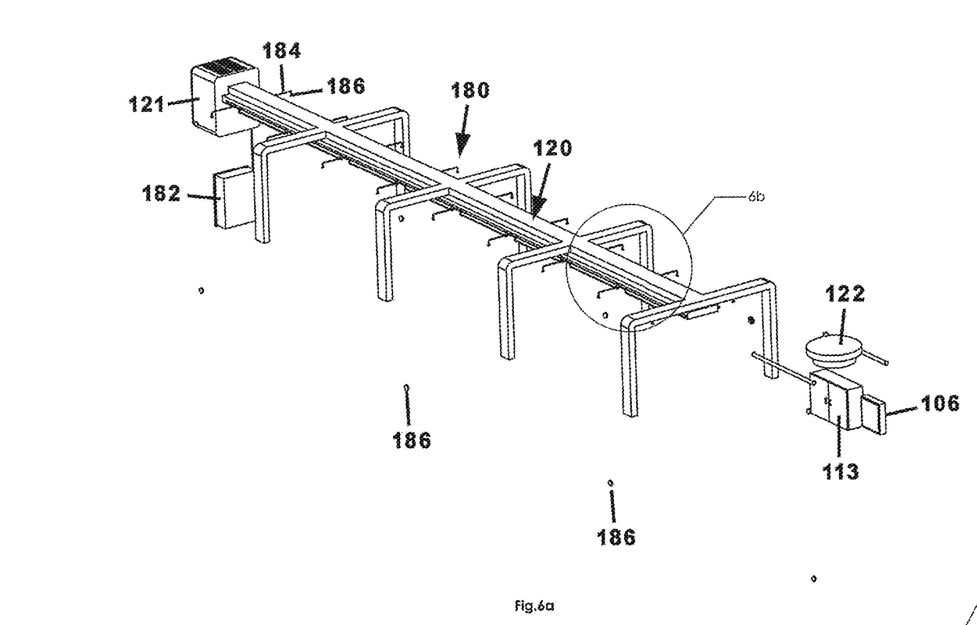
FIG. 6a is a perspective view of a ventilation network and self-cleaning assembly according to the present invention removed from the trailer of FIG. 5.
Figure 6B:
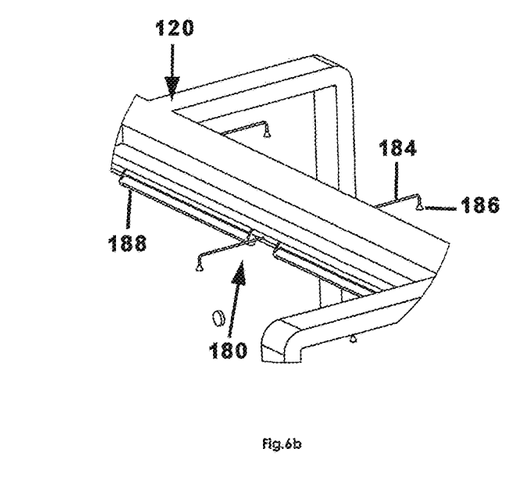

In still another critical aspect, entry into the laundry transport apparatus may be regulated for further decreasing any risk of exposure to pathogens, infections, and the like. The front compartment 114 may also be referred to as a foyer. The intention is that persons who desire to enter the rear compartment 116 (such as for collecting linens for a hospital department) will first enter into the foyer, where they may don Personal Protective Equipment (PPE), including masks, compatible respirators, and the like, and such as may be stored in a storage closet 119, bin, shelf, or the like. Also disclosed is a method and structure for decontamination of the PPE. Specifically, the method of decontamination includes the use of dry heat according to parameters set forth by the Food and Drug Administration (FDA). Decontamination of PPE may occur using the dry heat decontamination unit (FIGS. 4b and 6a). Specifically, the FDA indicates bio burden reduction systems that use dry heat to support single-user reuse of compatible respirators will not create an undue risk so long as:

respirator exposure to consistent temperatures of 70° C. for 60 minutes or 75° C. for 30 minutes chamber temperature is monitored closely and recorded throughout the cleaning cycle to confirm accurate and even distribution of the dry heat;

the system has highly controlled convective heat transfer to avoid the risk of localized over-temperature; and the system is not a household appliance paren e.g., home ovens, pressure cookers, multi-cookers) due to the lack of accuracy and precision in temperature control and the risks of cross-contamination from mixed-use.

The rear compartment 116 includes a linen storage area and a cart storage area. Preferably, the linen and cart storage areas are situated adjacent one another. The linen storage area may include a plurality of shelves 115 each being mounted to an interior side wall of the trailer 110, respectively. In an embodiment, shelves 115 may be mounted to both of the interior side walls of a trailer 110 and the plurality of carts 10 are situated intermediate the two sides of shelves 115 (FIG. 4a). In use, linens may be organized in stacks of the same types, i.e., hand towels together, pillowcases together, and the like, or may be secured together in bundles such as for an entire patient room, or the like. Accordingly, a representative of a department may quickly obtain needed linens and deposit them into a cart 10 for transport to the respective department as will be described again later.

In a critical aspect, each linen may be tracked electronically such that its location may be determined in real time. For example, it's real time status of being taken to the laundry facility, its position in the trailer 110, and it being removed from the trailer on 10 by a department representative can be determined. More particularly, each linen or linen package may include an RFID tag 200 or both, such as being sewn into or under the material of the respective linen. So as to be logged into the facility's computer network, a RFID scanner 102 may be mounted in either or both compartments of the interior area 112 of the trailer 110. The preferred procedure, then, would be for the department representative to scan each linen or linen combination 12 at the time of transfer. As a means for enforcing or, at least, verifying that faithful scanning of linens is taking place, each container 110 is equipped with one or more video cameras 104.

For context, RFID is an acronym for "radio-frequency identification" and refers to a technology whereby digital data encoded in RFID tags or smart labels are captured by a reader via radio waves. The advantage of RFID technology is that RFID tag data can be read outside the line-of-sight of a reader, whereas barcodes must be aligned with an optical scanner. RFID belongs to a group of technologies referred to as Automatic Identification and Data Capture (AIDC). AIDC methods automatically identify objects, collect data about them, and enter those data directly into computer systems with little or no human intervention.

In another aspect, a ventilation network 120 is included to pass air to and from the interior area 112. The ventilation network 120 includes branches 129 that may extend downwardly toward the carts 10 (FIG. 4a). The ventilation network 120 includes an intake duct for channeling air to the interior area 112 and an outlet duct for channeling air from the interior area 112. Apart from the ventilation network 120, the interior area 112 may be airtight when the door is at the closed configuration. To reduce or eliminate condensation, the intake and outlet ducts may form a heat exchanger. More particularly, at least a portion of the intake and outlet ducts are immediately adjacent one another to influence temperature of air passing through each duct. Warmer air passing through one of the ducts becomes cooler from transferring energy to the cooler air passing through the other duct and the cooler air becomes warmer from obtaining the energy from the warmer air.

In an embodiment, a climate controller (e.g., a heater and air conditioner) may be included for selectively heating and cooling air passing through the intake duct after the air is influenced by air passing through the outlet duct to cause the air passing through the intake duct to approximate a temperature of air in the interior area 112 separate from the ventilation network 120. In an embodiment, a dehumidifier is may be included for removing humidity from the air passing through the intake duct (e.g., after passing through the heat exchanger and the climate controller. In a related aspect, the ventilation network 120 and overall climate control system may be in fluid communication with and air handling unit 121 that may be positioned on an exterior surface of a front wall of the trailer 100. Further, the ventilation network 120 may include a foyer vent 122 positioned on an exterior of a roof of the trailer 100 and be in fluid communication with the front compartment 114 (FIGS. 1a and 2e).

Biosensors are analytical devices that convert a biological response into an electrical signal. The pathogen system may a plurality of biosensors 187 spaced apart and mounted the interior area of the container 110 so as to detect potentially harmful pathogens, which may include detection, identification, alert, containment, and remediation. In the exemplary embodiments, the pathogen system may monitor the airflow of ventilation network 120 or be positioned at predetermined locations throughout the open interior of both the front compartment 114 and the rear compartment 116. Detection of predetermined pathogens may trigger/actuate the self-cleaning assembly 180 as will be described in more detail below.

In general, the pathogen system may be configured in a variety of manners. In exemplary embodiments, the pathogen system coupled to a loading dock 150 adjacent the container 110 and 10 communication with a sampler. In another exemplary embodiment, the pathogen system is operatively coupled to a sampler that periodically samples the air. Such a "module" may still obtain power and communication connection from a transport apparatus, and still be considered "stand-alone." In an embodiment, a sampler may be operatively coupled to the ventilation network 120 for detecting potentially harmful pathogens. The sampler may be the biosensor 187 described above for detecting one or more predetermined pathogens.

It is understood that an electronic control system 108 may be incorporated and utilized by the present invention to detect, control, and coordinate the various assemblies and subsystems described herein. Various electronics and user controls may be contained in the control box 106 shown in FIG. 2a. More particularly, the control system 108 may include a processor 109a operatively coupled to the container 110 and configured to store (e.g., using a memory device 109b) and convey through an output device 109c, such as a digital display, transport data, time data, temperature data, content data, etc. as will be described later. The control system 108 may include an input device 109d, such as a touchscreen, keypad, or the like whereby a user may actuate the self-cleaning assembly 180. Auxiliary power may be provided to components onboard the container 110 through a solar power assembly 240.

Described now in further detail, the laundry transport apparatus described above may include a self-cleaning assembly 180 in data communication with the pathogen system or one or more dedicated pathogen biosensors. The self-cleaning assembly 180 may include a reservoir 182 capable of containing cleaning fluid or solution. Preferably, the reservoir 182 is mounted on an exterior wall of the trailer 110. Further the self-cleaning assembly 180 may include a conduit 184 having an elongate configuration and being mounted upwardly adjacent the plurality of laundry carts 10, i.e., positioned proximate to the cart area within the interior area and rear compartment 116 of the trailer 110 although, in an embodiment, the conduit 184 may also be positioned in the front compartment 114. The conduit 184 includes an end in fluid communication with the reservoir 182 such that the cleaning fluid may be transported via the conduit's 184. In an embodiment, the reservoir 182 may be positioned on an exterior surface of a front wall of the trailer 100 where it may be conveniently replaced or refilled. Still further, a plurality of nozzles 186 may be mounted along said conduit 184 in a spaced apart configuration and each being in fluid communication with the conduit 184. Each nozzle 186 is configured to dispense the cleaning fluid onto respective laundry carts 10 when actuated.

It is understood that the self-cleaning assembly 180 may be configured, such as via programming stored in memory in electrical communication with the processor 109a or with hard-wired electronics, to open all or a respective number of the plurality of nozzles 186 to spray the cleaning fluid, such as when the biosensors 187 detect a predetermined pathogen, such as in the air proximate the plurality of laundry carts 10. In an embodiment, the self-cleaning assembly 180 may be actuated only when a predetermined pathogen is detected, whenever all of the laundry carts have been loaded, prior to the plurality of laundry carts being unloaded, at predetermined times, or upon other conditions per the programming and input controls.

The self-cleaning assembly 180 may also include exposing treated linens to ultraviolet light. More particularly, an ultraviolet light 188 may be mounted adjacent a top wall of the container 110 and positioned within at least the rear compartment 116 and, optionally, in the front compartment 114. It is understood that the ultraviolet light 188 may be electrically connected to the processor 109a, to the biosensors 187, or to particular manual user controls. It is understood that references to the ultraviolet light 188 may refer to a plurality of ultraviolet lights 188 that are spaced apart and mounted throughout the container 110 and, optionally, adjacent traditional lights intended for visibility of users.

In another critical aspect, the laundry transport apparatus 100 and method of the present invention may include a solar assembly 240 that is configured to provide electrical power to the electric and electronic components described herein. In other words, some or all of the power required by the components of a laundry transport trailer 110 is collected from the sun. As will be understood by an electrician and others in the art, the solar assembly 240 may include at least one photovoltaic panel 242 (and, preferably, a plurality of photovoltaic panels) mounted to the sides or top of a trailer 110. It is understood that solar energy collected by the photovoltaic panels 242 may pass through and inverter configured to convert the collected energy into usable electrical current. The electricity may be stored in a battery, bank of batteries 244 positioned beneath the container 110 (FIG. 5), or other electrical storage component and directed to other assemblies via wires or electronics described above as needed.

Figure 8:
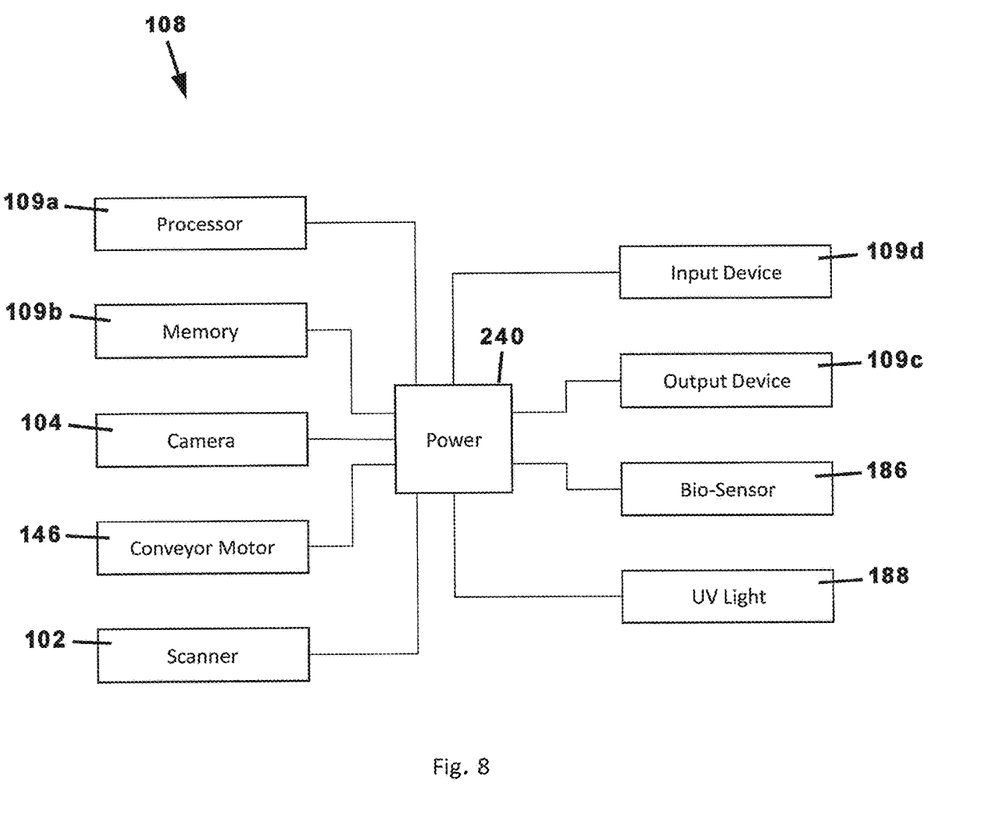
FIG. 8 is a block diagram illustrating the electronic components of the present invention.

As some of the plurality of carts 10 may be quite large and heavy when filled with laundry, it would be desirable to have a conveyor belt assembly (also referred to merely as a "conveyor assembly 140") movably mounted in the interior area of the trailer 110 and configured for use, when energized, in loading and unloading the plurality of carts into or out of the interior area of the trailer 110, respectively. The conveyor assembly 140 includes a continuous belt 141 in electrical communication with a conveyor motor 146 and a power source. In addition, the power source may be electrically connected to a controller 150 and, indirectly, to the conveyor assembly 140, all of the electric and electronic components of the apparatus as shown in FIG. 8 and being housed in the control box 106. The conveyor assembly 140 may be coupled to inner surfaces of the trailer 110 or may be supported by a framework (not shown). When energized, the continuous belt 141 has an outer surface operable to convey a laundry cart 10 downstream from a position displaced from the interior area of the trailer 110 downstream to an area inside the interior area of the trailer 110, or vice versa. The conveyor assembly 140 may include a conveyor motor 146 that is electrically connected to the continuous belt 141 and operable to cause the continuous belt 141 to move in a downstream direction when energized, such as under the control of a controller, a processor, or other electronics. The conveyor assembly 140 may include one or more input buttons (not shown) to enable a user to start, stop, or reverse direction of the continuous belt 141.

In use, clean laundry is placed in the container 110 at a laundering facility and transported to its destination (e.g., a healthcare facility, etc.). A heat exchanger, climate controller, and dehumidifier may maintain ventilation and acceptable humidity in the interior area 112 for the laundry during transport and after being left at a dock, such as at a hospital, all of which have been discussed in detail in the related issued patents disclosed above. As such, the laundry may be transported further distances or simply housed in the container 110 for longer amounts of time than possible in prior art systems. In other words, the trailer 110 may serve as a mobile clean room. Additionally, the pathogen system, including the biosensors 187, may provide for remediation of detected pathogens, or prophylactic treatment enroute.

In many applications, the way laundry is transported is very important. Healthcare facilities, for example, may be required to comply with the Joint Commission on Accreditation of Healthcare Organizations and infectious control guidelines. As should be readily appreciated, transporting or storing clean laundry in a manner that does not protect the laundry from moisture, undesirable temperatures, insects, textile mold, or mildew is not acceptable. Prior art methods and systems often make multiple trips to a single facility during working (i.e., business) hours to maintain the clean nature of the laundry and to collect soiled laundry.

In most prior art situations, the end user collects laundry during working hours from various workstations. Soiled laundry is placed into linen carts that remain in specified locations throughout the facility. The soiled linen carts are picked up upon arrival of a laundry truck from a processing plant and weighed prior to loading onto the laundry truck. This process can be very inefficient and can lead to delays for both the cleaning staff and the launderers.

The invention discloses a laundry transportation and storage system and method that utilizes the laundry transport apparatus 100. Clean laundry, may be moved into the rear compartment 116, and organized and stacked on the plurality of shelves 115 that may line the sidewalls of the container and 10.

The pathogen system, which may include the plurality of biosensors 187 described above, may pre-screen the environment of the interior area 112 to determine if potentially harmful pathogens are present. It is understood that this prescreening may occur at the laundry facility itself prior to transporting the container 110 or even while enroute to the facility. The pathogen system may have the capacity to provide notice of a potentially harmful contaminant, permitting an operator to curtail further transport activity in order to address the potential pathogen. The pathogen detection process may include pre-screening that includes ongoing or more frequent pathogen screening and rerouting the cargo back to the laundry facility for further testing and proper remediation. During pre-screening and further screening, the environment of interior area 112 is maintained within container 110. Embodiments of the pathogen system may be configured to treat particular pathogens within container 110.

The container 110 housing clean laundry in the interior area 112 may be moved (e.g., by a truck) to a loading dock (e.g., adjacent a hospital) and left at the loading dock and the airflow and ventilation described above regarding may occur. Then, representatives from the various hospital departments, such as nursing assistants, inventory controllers, and the like, may actually enter into the container 110 and remove fresh/laundered linens, subject to various and controlled conditions. Namely, the self-cleaning assembly 180 disclosed above is configured to regularly clean and sanitize the open interior area of both the front compartment 114 and rear compartment 116 of the open interior area 112 of the container/trailer 110. Depending on user settings, the self-cleaning assembly 180 may dispense a cleaning fluid via the plurality of spaced apart nozzles 186 and electrical actuation of the UV lights at predetermined times, only when actuated by detection of a pathogen by said biosensors 187, or only when activated by an administrator. Accordingly, the stored linens are maintained in a clean and sanitized status until taken for use.

Figure 7:
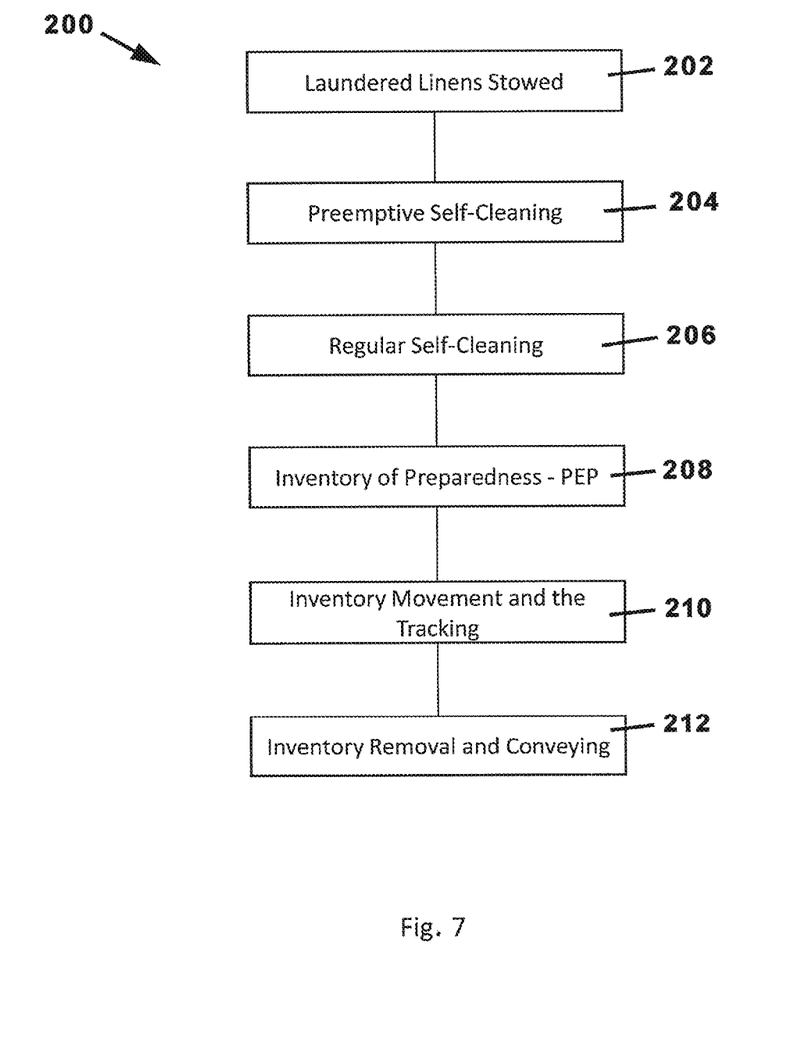
FIG. 7 is a flowchart illustrating a process for using the laundry transport container as in FIG. 5.

A process or method of using the laundry transport apparatus 10 is referred to as process 200, is shown in FIG. 7, and is described below. Referenced as step 202, the process 200 as described in this application begins with the laundered linens being stowed on respective shelves 115 of the rear compartment 116 of the mobile clean room, i.e., the trailer 110. In some embodiments, the stowed linens may undergo a prescreening and advanced screening process and, if indicated by the data from the plurality of biosensors 187, the self-cleaning assembly 180 may be actuated to self-cleaning one or both of the front and rear compartments 114, 116, as indicated at step 204. As described above, this sanitizing step may be performed before the trailer 110 leaves the laundry facility or performed enroute to the medical facility where it is to be dropped off. Thereafter, as shown at step 206, the self-cleaning assembly 180 may be actuated when the plurality of biosensors 187 detect predetermined pathogens, at regular spaced apart predetermined intervals of time, or when manually actuated by a user, as described above.

At step 208, the process 200 illustrates when a user, such as a departmental inventory representative, initially enters the front compartment 114, i.e., the foyer, dons appropriate PEP, and opens the interior door 118 so as to provide access to the rear compartment 116 with an intention to remove needed linens stored therein. Then, at step 210, the process 200 illustrates that respective identification tags associated with removed linens are scanned via the RFID scanner 102 such that all inventory is tracked in real time, said the scanning being monitored by respective video surveillance cameras 104 mounted within the interior spaces of the front and rear compartments 114, 116.

As indicated at step 212, the process 200 includes finalizing and inventory transfer, which may include conveying a potentially heavy cart 10 using the conveyor belt assembly 140, closing the interior door 118, and initiating a decontamination of the PPE, such as by inserting said PPE into the dry heat decontamination unit 113 and actuating a sanitizing cycle.

The foregoing disclosure and description of the invention is illustrative and explanatory thereof. The present invention should only be limited by the following claims and their legal equivalents. The inventor trusts and relies on this legal principle, in order to avoid being unnecessarily repetitive and verbose. Various changes in the details of the illustrated construction may be made within the scope of the appended claims by one having ordinary skill in the art without departing from the spirit of the invention and scope of the claims. Such changes expressly considered are other combinations, permutations, and arrangements of the elements contained within the apparatus described above.

The invention claimed is:

1. A laundry transport apparatus, comprising:
a trailer having opposed front and rear ends and an exterior shell extending between said front and rear ends, said trailer defining an opening at said front end and defining an interior area;
wherein said trailer includes a door at said trailer front end for selectively allowing access to said interior area, said door being movable between a closed configuration preventing access to said interior area and an open configuration giving access to said interior area;
a solar assembly that includes at least one photovoltaic panel coupled to said exterior shell and operable to receive solar energy, said solar assembly having an inverter for converting said received solar energy into electricity;
a plurality of laundry carts removably positioned in said interior area, each laundry cart configured to hold laundry;
a conveyor assembly that includes a continuous belt positioned in said interior area and having a first end proximate said trailer front end and a second end displaced into said interior area, said continuous belt being electrically connected to said solar assembly and operably movable when energized for moving said continuous belt, whereby to move said plurality of laundry carts into or out of said interior area;
a self-cleaning assembly positioned in said interior area upwardly proximate said plurality of carts, said self-cleaning assembly including a reservoir containing a cleaning fluid and a plurality of nozzles in fluid communication with said reservoir configured for dispensing said cleaning fluid onto said plurality of carts when actuated;
a ventilation network situated in said interior area and configured to pass air to and from said interior area, said ventilation network including:
an intake duct operatively coupled to a top wall of said trailer and extending longitudinally between said front and rear ends, said intake duct configured to for channeling channel air to said interior area;

an outlet duct configured to channel air away from said
interior area;
wherein said ventilation network is configured to cause air
to pass through either or both said intake duct and said
outlet duct;
at least one fan configured to cause air to pass through
said intake duct and said outlet duct;
wherein said interior area is airtight apart from said
ventilation network when said door is at said closed
configuration;
wherein at least a portion of said intake and outlet ducts
are immediately adjacent one another to influence
temperature of air passing through one of said intake
duct and said outlet duct, warmer air passing through
one of said intake duct or said outlet duct becoming
cooler and cooler air passing through another of said
intake duct or said outlet duct becoming warmer;
wherein said intake and outlet ducts include a plurality of
branches extending outwardly and downwardly, each
branch having a terminal end defining an opening
positioned immediately adjacent a top of a respective
laundry cart so as to ventilate the laundry in said
laundry cart.

2. The laundry transport apparatus as in claim 1, wherein said self-cleaning assembly includes a pathogen sensor for detecting a predetermined pathogen in said interior area and is operable to energize said self-cleaning assembly when said predetermined pathogen is detected.

3. The laundry transport apparatus as in claim 1, further comprising:
a climate controller for selectively heating and cooling air passing through said intake duct after said air is influenced by air passing through said outlet duct to cause said air passing through said intake duct to approximate a temperature of air in said interior area separate from said ventilation network; and
a dehumidifier to selectively dehumidify air passing through said intake duct.

4. The laundry transport apparatus as in claim 1, wherein:
said trailer has a cart area configured to accommodate said plurality of laundry carts;
a processor operatively coupled to said container area and configured to store and convey transport data, the transport data includes at least one of: time data, duration data, and temperature data.

5. The laundry transport apparatus as in claim 1, further comprising a pathogen system having a flow management system for directing an airflow and operatively coupled to a pathogen control processor configured to (1) control the flow management system to detect and isolate a portion of the airflow determined to be contaminated with potential pathogens, and to (2) selectively route six the contaminated portion of the airflow for pathogen isolation.

6. The laundry transport apparatus as in claim 5 wherein pathogen system is in data communication with said self-cleaning assembly and said pathogen control processor is configured to energize said self-cleaning assembly when said flow management system detects said potential pathogens.

7. The laundry transport apparatus as in claim 1 wherein said conveyor assembly includes a motor being electrically connected to said solar assembly and operably coupled to said continuous belt.

8. The laundry transport apparatus as in claim 1 wherein said self-cleaning assembly includes a conduit having a proximal end in fluid communication with said reservoir and a distal end opposite said proximal end, said plurality of nozzles being coupled to and in fluid communication with said conduit.

9. The laundry transport apparatus of claim 1, further comprising a processor operatively coupled to said trailer configured to store and convey transport data, wherein said transport data includes at least one of: time data and temperature data.

10. The laundry transport apparatus of claim 1, further comprising personal protective equipment (PPE) that is reusable and that has been decontaminated using dry heat.

11. A laundry transport apparatus, comprising:
a trailer having opposed front and rear ends, said container defining an opening at said front end and an interior area;
wherein said container includes a door at said container front end for selectively accessing said interior area, said door being movable between a closed configuration preventing access to said interior area and an open configuration giving access to said interior area;
a plurality of laundry carts removably positioned in said interior space, each laundry cart configured to hold laundry;
a ventilation network situated in said interior area and configured to pass air to and from said interior area, said ventilation network including:
an intake duct operatively coupled to a top wall of said trailer and extending longitudinally between said front and rear ends, said intake duct configured to channel air to said interior area;
an outlet duct immediately adjacent said intake duct and configured to channel air away from said interior area;
at least one fan configured to cause air to pass through said intake duct and said outlet duct;
wherein said interior area is airtight apart from said ventilation network when said door is at said closed configuration;
wherein intake and outlet ducts are immediately adjacent one another between said trailer front and rear ends to thereby form a heat exchange relationship so as to influence temperature of air passing through each said duct, warmer air passing through one of said intake duct or said outlet duct and thereby becoming cooler and cooler air passing through another of said intake duct or said outlet duct and thereby becoming warmer;
wherein said intake and outlet ducts include a plurality of branches extending outwardly and downwardly, each branch having a terminal end defining an opening positioned immediately adjacent a top of a respective laundry cart so as to ventilate said laundry in said respective laundry cart;
a climate controller for selectively heating and cooling air passing through said intake duct after said air is influenced by air passing through said outlet duct to cause said air passing through said intake duct to approximate a temperature of air in said interior area separate from said ventilation network;
a dehumidifier to selectively dehumidify air passing through said intake duct; and
a pathogen system having a flow management system, for directing an airflow, operatively coupled to a pathogen control processor;
said pathogen control processor capable of controlling the flow management system to detect and isolate a portion of the airflow determined to be contaminated with potential pathogens, and selectively routing the contaminated portion of the airflow for isolation;

a conveyor assembly that includes a continuous belt positioned in said interior area and having a first end proximate said trailer front end and a second end displaced into said interior area, said continuous belt being electrically connected to said solar assembly and operably movable when energized for moving said continuous belt, whereby to move said plurality of laundry carts into or out of said interior area;

a self-cleaning assembly positioned in said interior area upwardly proximate said plurality of carts, said self-cleaning assembly including a reservoir containing a cleaning fluid and a plurality of nozzles in fluid communication with said reservoir configured for dispensing said cleaning fluid onto said plurality of carts when actuated.

12. The laundry transport apparatus of claim 11 further comprising a solar assembly that includes at least one photovoltaic panel coupled to said trailer and operable to receive solar energy, said solar assembly having an inverter for converting said received solar energy into electricity.

13. The laundry transport apparatus as in claim 11, wherein pathogen system is in data communication with said self-cleaning assembly and said pathogen control processor is configured to energize said self-cleaning assembly when said flow management system detects said potential pathogens.

14. The laundry transport apparatus as in claim 1 wherein said conveyor assembly includes a motor electrically connected to said solar assembly and operably coupled to said continuous belt for moving said continuous belt when energized.

15. The laundry transport apparatus as in claim 11 wherein said self-cleaning assembly includes a conduit having a proximal end in fluid communication with said reservoir and a distal end opposite said proximal end, said plurality of nozzles being coupled to and in fluid communication with said conduit.

16. The laundry transport apparatus of claim 11, wherein the pathogen system has the capacity to perform pathogen remediation of the contaminated portion of the airflow.

17. The laundry transport apparatus of claim 16, wherein the pathogen system is a stand-alone module, operatively coupled to the ventilation network.

18. The laundry transport apparatus of claim 11, further comprising personal protective equipment (PPE) that is reusable and that has been decontaminated using dry heat.

* * * * *